July 28, 1970   G. P. HAMILTON   3,521,740
PROCESSING CONVEYOR
Filed April 16, 1968   2 Sheets-Sheet 2
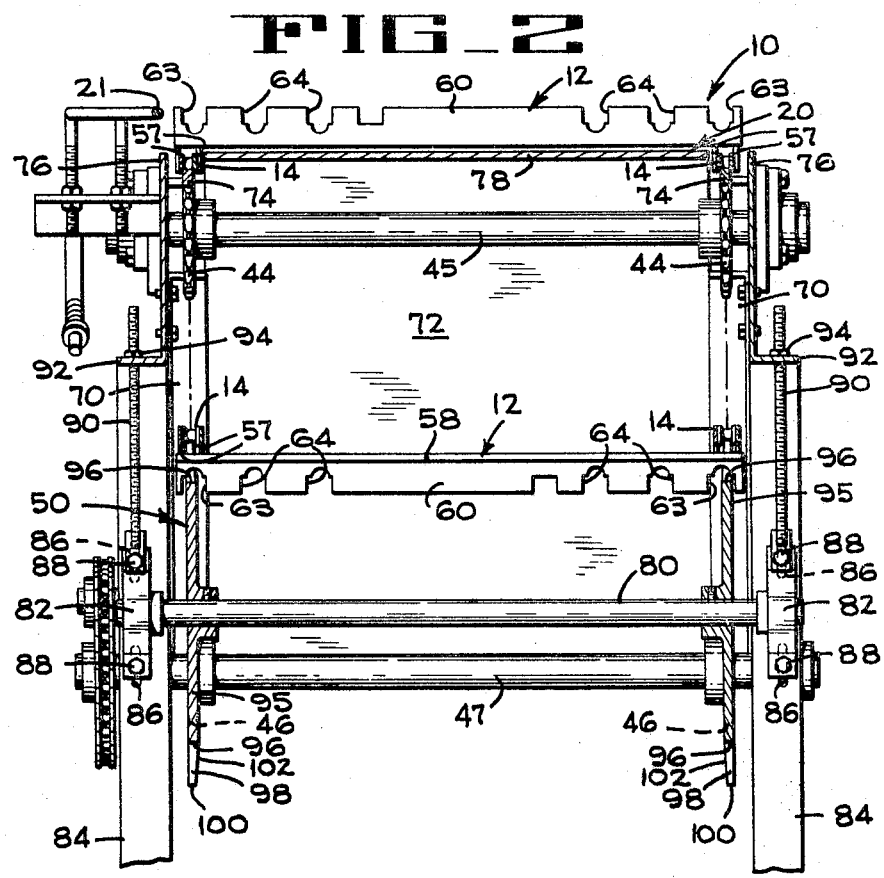
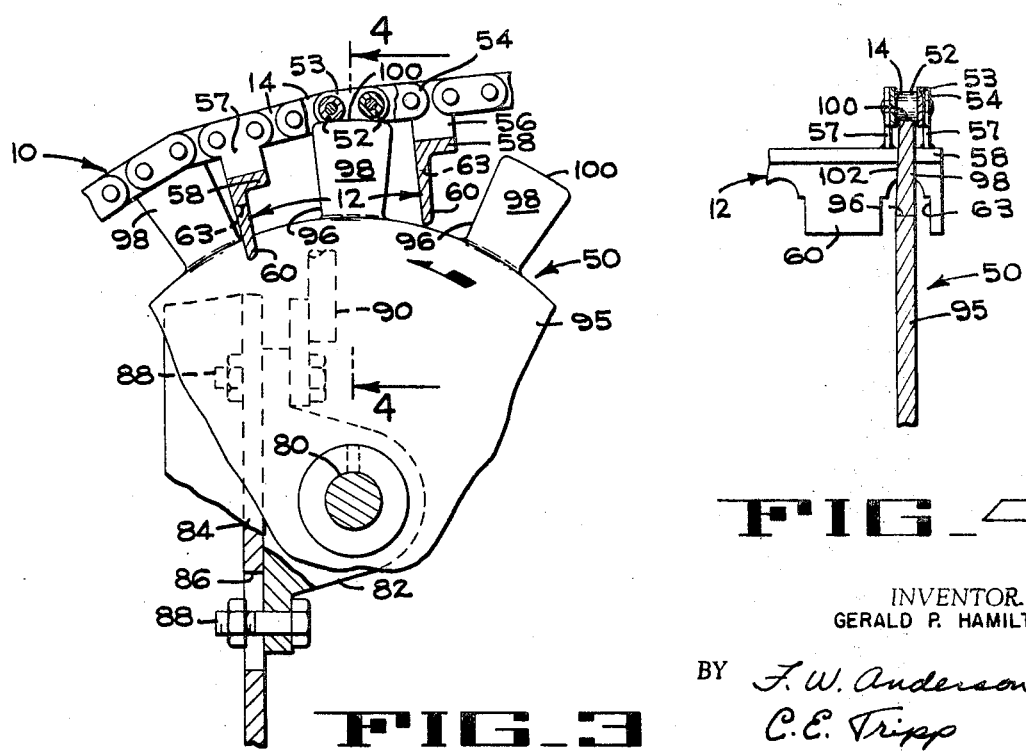
INVENTOR.
GERALD P. HAMILTON
BY  F. W. Anderson
    C. E. Tripp
        ATTORNEYS United States Patent Office 3,521,740
Patented July 28, 1970

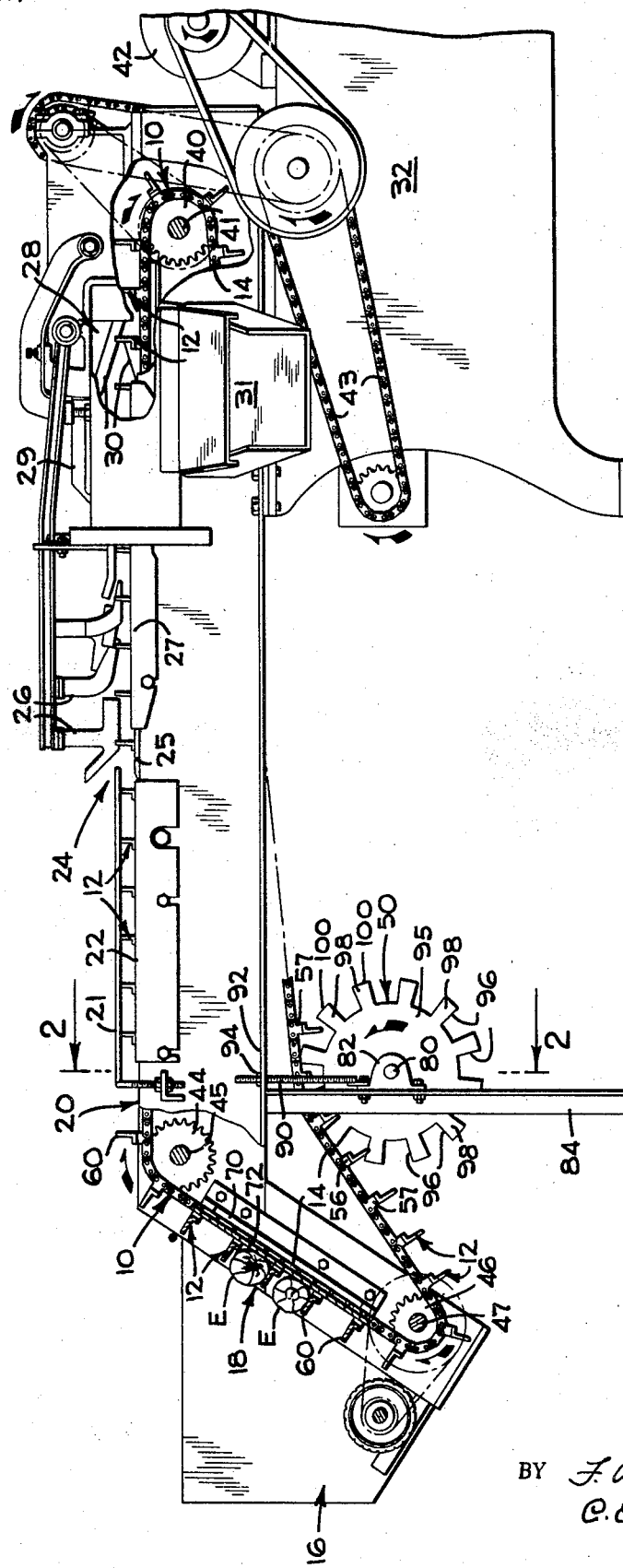

3,521,740
PROCESSING CONVEYOR
Gerald P. Hamilton, Hoopeston, Ill., assignor to FMC Corporation, San Jose, Calif., a corporation of Delaware
Filed Apr. 16, 1968, Ser. No. 721,702
Int. Cl. B25g 19/00
U.S. Cl. 198—208                                                   1 Claim

ABSTRACT OF THE DISCLOSURE

A convtyor for ears of corn or the like has transverse flight bars connected to and overlying side roller chains, and the conveyor is tightened by jockey pulleys on the flight bar side of the conveyor. The pulleys are notched to receive the flight bars, the notches providing chain guide teeth which directly engage the side chain rollers intermediate the flight bars.

BACKGROUND OF THE INVENTION

This invtntion relates to conveyor apparatus for pushing ears of corn or the like along a processing table such as that forming part of a corn husker, and more specifically relates to a specially formed jockey or idler pulley assembly for taking up slack of the conveyor chains while accommodating passage of slack bars over the assembly.

This invention represents an improvement in the conveyor structure of apparatus for sorting and trimming corn before husking such as that described and claimed in the application of Ross et al., Ser. No. 628,973 filed Apr. 6, 1967. In the apparatus of the Ross et al. application, ears of corn are pushed along a processing table for sorting and end trimming by means of the transversely extending flight bars of an endless conveyor. These flight bars are connected at their ends to side roller chains and overlie the chains.

It has been found desirable to maintain tension on the conveyor chains of such an apparatus by idler means engaging the lower reach thereof, which idler means not only tension the chains but support their lower reach. On the lower reach the flight bars project downwardly from the chains. Thus, idler means for the lower reach will engage the chains on their flight bar sides, and since the flight bars overlie or extend across the chains (as mentioned), the flight bars must be accommodated by the idlers. Heretofore it has been proposed to use rubber covered rollers asthe idler means for these conveyors to accommodate the flight bars as they pass over the idlers. The attendant twisting or canting action on the flight bars and resultant flexing of the side chains was found to cause premature wear of the side chains as they pass over the idlers or tightening rollers.

SUMMARY OF THE INVENTION

In accordance with the present invention, the aforesaid rubber covered tightening rollers are replaced with a pair of specially formed jockey pulleys keyed to a common cross shaft. These jockey pulleys comprise generally circular discs that are notched to receive, and hence to accommodate passage of the flight bars as the associated portions of the chains pass over the pulleys. The notches of the disc provide chain guide teeth, the peripheral portions of which lie in circular arcs, and which directly engage and support the rollers of the side chains at zones intermediate of the flight bars. The jockey pulleys are adjustably mounted on the husker frame for tightening the chains. Thus, the notched (toothed) pulleys serve the desired chain tightening function without causing flexing and wear of the chains due to canting engagement of the flight bars with the chain tightening pulleys. As a result, firm tightening forces can be applied directly to the chains, and chain wear is not increased in a manner characteristic of the previously employed rubber tightener rollers, as described above.

BRIEF DESCRIPTION OF THE DRAWING

FIG. 1 is a side elevation of a corn husker involving the present invention with parts broken away.

FIG. 2 is a section taken on line 2—2 of FIG. 1.

FIG. 3 is a fragmentary enlarged elevation of the jockey pulley of the present invention showing a conveyor chain passing thereover.

FIG. 4 is a section taken on line 4—4 of FIG. 3.

GENERAL DESCRIPTION OF THE HUSKER

The invention will be illustrated and described in a machine to which it is particularly adapted, namely a corn husker which also includes sorting and end trimming operations. Ears of corn E are conveyed through the husker and up to husking rolls by an endless conveyor 10 having transvese or lateral flight bars 12. The flight bars are connected at their ends to conventional roller side chains 14, the flight bars overlying the chains. The ears of corn within their husks and untrimmed at their ends are supplied from a metering hopper 16 to an elevating section 18 of the conveyor 10. At the elevating section, the flight bars 12 lift ears up onto a horizontal ear aligning section 20 of the conveyor where the ears rest upon diagonal chains (shown in the Ross et al. application) which urge the ears against end stops 21, 22 at one side of the machine (FIG. 1). Thus, no matter how the ears are oriented the flight bars of the conveyor slide them along a sorting section 24. Here, the ears pass over a pivot bar 25 and underneath pressure shoes 26, which in connection with another set of diagonal conveyor chains (not shown) sorts the ears in accordance with their end-to-end orientation. The details of these elements of the apparatus are not critical to the present invention and are explained fully in the aforesaid Ross et al. application which also claims the sorting portion.

The ears, whose butt ends are on the near side of the machine as seen in FIG. 1, slide along a butt stop 27 and through the trimmer section 28, there being a similar section on the other side for trimming the tassel ends of the ears. At the trimmer section 28, a pressure shoe 29 holds down the ears they pass between butt knives 30, which trim the butts from the ears and deposit them in a chute 31. The ears which are pointed in the other direction, have their tassel ends trimmed by similar structure. The conveyor 10 continues to advance the trimmed ears to a husker section 32, the details of which are not illustrated and which are not critical to the present invention. Here, the husks are removed from the ears by husking rollers (not shown).

CONVEYOR DETAILS

Having described briefly a machine which is particularly adapted for use with the present invention, additional details of the conveyor 10 will now be described. The conveyor 10 is an endless conveyor that passes over three pairs of ordinary sprockets and over the idler pulleys of the present invention. At the husking end of the machine, the conveyor chains 14 pass over drive sprockets 40, keyed to a drive shaft 41 and driven by a motor 42 through gearing shown in FIG. 1, the details of which are not critical to the present invention. The husker rolls are driven by a chain 43.

The conveyor passes over two pairs of idler sprockets, namely, intermediate idler sprockets 44 which are freely rotatable on a cross shaft 45, and lower end idler sprockets 46 which are freely rotatable on a cross shaft 47. The lower reach of the conveyor 10 is supported on and the conveyor chains are tightened by the jockey pulley or idler assembly 50 of the present invention, the details of which will be described presently.

The side chains 14 are of conventional linked roller chain construction having hardened rollers 52 connected by staggered links 53, 54 (FIGS. 3 and 4). The transverse side bars 12 are connected to every fifth pitch of the chain by special links 56, 57 which include projecting ears that are welded to the base flanges 58 of the flight bars (FIG. 4). The flight bars include radial pusher flanges 60 projecting from the base flanges 58 and formed with end notches 63 for partially accommodating the jockey pulleys 50, and for cleaning the presser feet at the butt end trimming knives. Other notches 64 are formed on the flight bars to accommodate presser feet at the sorting station, the details of which are no critical to the present invention. Referring briefly to the chain and table assembly, the rollers of the side chains 14 ride up along guide bars 70 on the elevator section 18 of the husker (FIG. 1), these bars being mounted on an inclined table 72 which support the ears E while they are being elevated.

Along the top of the machine, horizontal guide rails 74 are mounted on side plates 76 (FIG. 2) of the machine and are disposed at each side of a main table 78, which table supports the ears as they are pushed by the various processing stations by the conveyor flights 12.

JOCKEY PULLEY ASSEMBLY

The jockey pulley assembly 50 includes a cross shaft 80 keyed to each of the notched jockey pulleys. The shaft is mounted in bearings 82 which are adjustably secured to vertical legs 84, slotted at 86 (FIG. 3) to receive the bearing mounting bolts 88. Thus, the pulley assemblies 50 can be secured in their adjusted, chain tightening position.

In order to facilitate vertical adjustment of the jockey pulley assembly 50, long adjusting screws 90 depend through holes in side plate flanges 92 (FIG. 2). The lower ends of the adjusting screws 90 are welded to lugs attached to the shaft bearings 82. Adjusting nuts 94 are threaded onto the adjusting screws 90 and bear against the side plate flanges 92, so that rotation of the nuts 94 will position the jockey pulleys assembly to the desired chain tightening position.

The jockey pulleys may be referred to as generally circular discs notched to accommodate the flight bars 12 and to provide chain guide teeth, with the peripheral portions of the teeth being arcs of a common circle. Thus, as seen in FIGS. 3 and 4, the jockey pulley assemblies 50 each comprise a circular disc 95, the thickness of which is substantially equal to the length of the side chain rollers 52. The discs are notched at 96 which notches provide chain guide teeth 98 having peripheral portions 100 which engage the chain rollers and which portions form arcs of a common circle. The notches 96 receive and accommodate the conveyor flight bars 12 as the conveyor passes over the jockey pulleys. As seen in FIGS. 3 and 4 the end notches 63 in the flight bar flanges 62 straddle the jockey pulley discs at the base portions of the pulley disc notches 96. This construction does not make it necessary to make the disc notch 96 deep enough to accommodate the entire radial dimension of the conveyor flights 12, with a consequent weakening of the discs.

With the jockey pulley construction of the present invention, the notched discs can be placed at the lower reach of the conveyor and on the underside of the chain which, in this case, is also the side of the chain in which the flight bars project radially outwardly. However, due to the notched disc construction, chain guide and support teeth 98 are formed, which teeth have arcuate peripheral portions that bear directly against the chain rollers and hence will support the rollers 52 and tighten the conveyor chain assembly without causing canting of the flight bars and flexing of the chain links which mount the flights 12. Thus, the conveyor flights 12 pass over the adjusting pulleys undisturbed and hence the introduction of the chain tighteners at this position does not increase the wear of the conveyor side chains 14.

In order to facilitate threading of the conveyor side chains onto the jockey pulley discs 95, the inner faces of these discs are beveled at 102 (FIG. 4). This beveling was found to facilitate fitting of the chains onto the jockey pulleys without requiring an undesirably thin disc structure, with a consequent weakness at the basis of the chain guide teeth 98.

In the construction illustrated, the jockey pulley discs 95 have an outside diameter, that is the diameter at the periphery of the guide teeth, of approximately fourteen inches. The diameter of the cricle enveloping the bases of the notches in the discs is approximately ten inches. The discs have a body portion of about 3/8 of an inch thick and the guide teeth are tapered from their bases at the bases of the notches to the peripheral portions down to approximately 9/32 of an inch in thickness at the periphery of the teeth.

Although the best mode contemplated for carrying out the present invention has been herein shown and described, it will be apparent that modification and variation may be made without departing from what is regarded to be the subject matter of the invention as set forth in the appended claim.

Having completed a detailed description of the invention so that those skilled in the art could practice the same, I claim:

1. Apparatus for pushing ears of corn or the like along a processing table by means of the upper reach of an endless conveyor, said conveyor comprising a pair of side roller chains to which laterally extending flight bars are connected with the flight bar ends extending over the chains, side chain sprockets at the ends of the conveyor; and jockey pulleys for tightening a non-conveying reach of said conveyor, said jockey pulleys comprising generally circular discs notched to provide chain guide teeth and keyed to a common cross shaft, the notches in said discs being aligned with and receiving passing flight bars, the peripheral portions of said guide teeth directly engaging and supporting those side chain rollers disposed intermediate the passing flight bars; the improvement wherein said flight bars are also notched to receive those portions of said pulley discs which are disposed at the bottoms of the notches in the discs.

References Cited

UNITED STATES PATENTS

| 3,386,560 | 6/1968 | Ross et al. | 198—31 |
| 3,127,004 | 3/1964 | Richter et al. | 198—208 |
| 2,573,334 | 10/1951 | Hitz | 198—173 |

FOREIGN PATENTS

| 765,203 | 1/1957 | Great Britain. |
| 1,090,851 | 11/1967 | Great Britain. |

EVON C. BLUNK, Primary Examiner

R. S. GAITHER, Assistant Examiner

U.S. Cl. X.R.

198—173